No. 658,753. Patented Oct. 2, 1900.
G. B. BLANCHARD.
RAIL BOND.
(Application filed June 25, 1900.)
(No Model.)
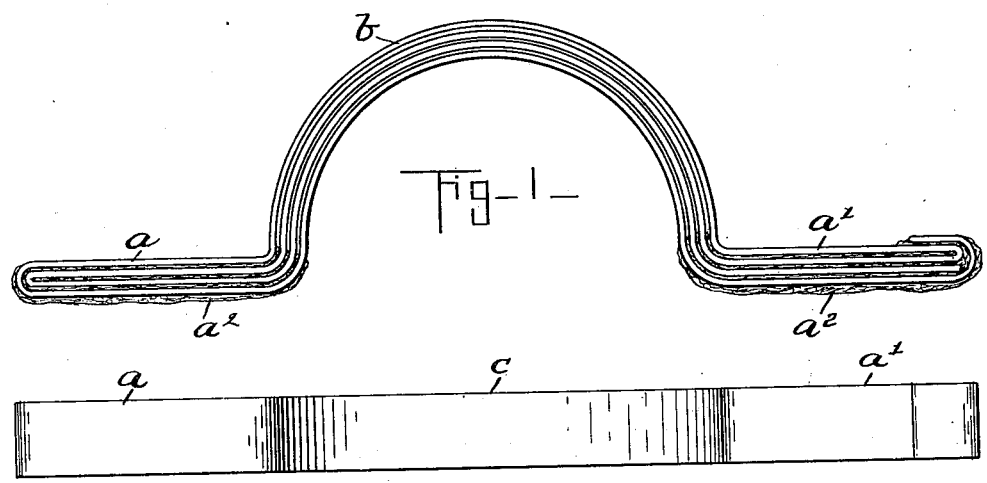
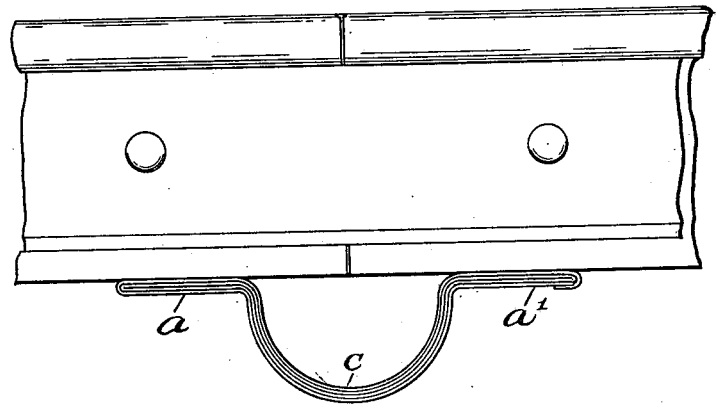
Witnesses:
H. B. Davis.
F. H. Noyes
Inventor:
George B. Blanchard
by B. J. Noyes
Atty

UNITED STATES PATENT OFFICE.

GEORGE B. BLANCHARD, OF SEATTLE, WASHINGTON.

RAIL-BOND.

SPECIFICATION forming part of Letters Patent No. 658,753, dated October 2, 1900.

Application filed June 25, 1900. Serial No. 21,459. (No model.)

*To all whom it may concern:*

Be it known that I, GEORGE B. BLANCHARD, of Seattle, county of King, State of Washington, have invented an Improvement in Rail-Bonds, of which the following description, in connection with the accompanying drawings, is a specification, like letters on the drawings representing like parts.

This invention has for its object to improve and simplify the construction of rail-bonds and to especially adapt them to be readily applied to the rails and a good contact insured.

In accordance with this invention a laminated strip is employed, which is bent to form a pair of flat feet and an arched intermediate portion, and said laminated strip may be composed of a continuous strip of conducting material. The several layers composing the flat feet will be soldered together to insure the requisite conductivity and also to hold said layers together, and the several layers composing the arched intermediate portion will remain unattached, and a layer of solder will be applied to the bottoms of both of the flat feet to provide for the ready attachment of the bond to the rails. In addition to securing together the several layers composing the flat feet by solder said layers are secured together by integral portions of the lowermost layer of the laminated strip—as, for instance, if a continuous conducting-strip is employed to produce the laminated strip said continuous conducting-strip may be folded upon itself to form the inner and uppermost layers of the laminated strip and then carried around the end of one of the feet and thence along the under side of the strip from end to end thereof and thence around the end of the other foot, and when said continuous conducting-strip is so folded or bent integral portions of the lowermost layer will inclose the ends of both of the feet, and thereby assist in holding the several layers of the laminated strip together, yet so far as my invention is concerned the ends of both of the feet may be otherwise inclosed by integral portions of the lowermost layer of the laminated strip to accomplish the same result.

Figure 1 shows in side elevation a rail-bond embodying this invention. Fig. 2 is a plan view of the same, and Fig. 3 is a detail showing the rail-bond applied to the adjacent ends of the rails.

The bond which is herein shown for the sake of illustrating this invention consists, essentially, of a continuous strip of conducting material, such as copper, bent or folded upon itself to form a number of superimposed layers, and thereby produce a laminated strip. The laminated strip is bent or formed to produce a pair of flat feet $a\ a'$ and an arched intermediate portion $b$. The several layers composing the flat feet $a\ a'$ are soldered together, and the several layers composing the arched intermediate portion $b$ will remain unattached. As shown in the drawings, the continuous strip of conducting material is bent or folded upon itself to comprise the inner and uppermost layers of the laminated strip, and then said conducting-strip is continued around the end of one of the feet and along the under side of the aforesaid layers from end to end thereof and thence around the end of the other foot. When the laminated strip is thus produced, it will be seen that the ends of both of the flat feet $a\ a'$ will be inclosed by integral portions of the lowermost layer of the laminated strip and the several layers of the laminated strip thereby more securely and effectively held together and the solder alone not relied upon as the sole means of accomplishing this result. However, I do not desire to confine my invention to producing the laminated strip in the manner shown, as it may be otherwise produced and the ends of both of the feet inclosed, and thereby locked together by integral portions of the lowermost layer of the laminated strip.

The intermediate portion of the bond is arched for the sake of providing the requisite flexibility and extensibility, and said arched intermediate portion is herein shown as semicircular in shape, yet it is obvious that it may be of any other design and subserve the desired ends.

A layer of solder $a^2$ is applied to the bottoms of both of the flat feet $a\ a'$ to provide for the ready attachment of the bond to the rails.

A rail-bond composed of a laminated strip of copper is inexpensive and possesses the requisite conductivity and effectively provides for the separation of the rails to which it is attached; but the construction of such bond for practical use must be such that the several layers composing it will be securely held together in such manner as to eliminate all tendency of the layers separating under any and all conditions at the points of attachment with the rails and a permanent contact with the rails maintained, and by inclosing the ends of the flat feet in integral portions of the lowermost layer and soldering all the layers composing said feet together I am able to accomplish the desired ends.

To apply my new and improved form of bond, the rails will be operated upon in any suitable manner, so as to provide a bright surface, and they are then heated, and when hot enough to melt the solder the bond having the layers of solder $a^2$ on the bottoms of its feet is pressed hard against the rails and held by suitable clamps or otherwise in such position until by cooling the solder hardens. Hence the necesssity of providing the layers $a^2$ of solder on the bottoms of the feet of the bond.

I claim—

1. A rail-bond consisting of a laminated strip bent to form a pair of flat feet and an arched intermediate portion and composed of a continuous strip of conducting material folded upon itself to form the inner and uppermost layers of the strip and thence continued along the under side of the aforesaid layers to form the lowermost layer and inclose the ends of both of the feet and thereby assist in holding the several layers together, the layers composing the flat feet being soldered together and the layers composing the arched intermediate portion being unattached, substantially as described.

2. A rail-bond consisting of a laminated strip bent to form a pair of flat feet and an arched intermediate portion, the layers composing said flat feet being soldered together and the layers composing the arched intermediate portion being unattached, and the several layers composing said laminated strip being additionally secured together by integral portions of the lowermost layer, substantially as described.

In testimony whereof I have signed my name to this specification in the presence of two subscribing witnesses.

GEORGE B. BLANCHARD.

Witnesses:
B. J. NOYES,
H. B. DAVIS.